Oct. 2, 1956
T. F. KÜMMICH
2,764,904
TRANSMISSION WITH GEAR GROUPS CONNECTED
IN TANDEM ARRANGEMENT
Filed Feb. 12, 1952
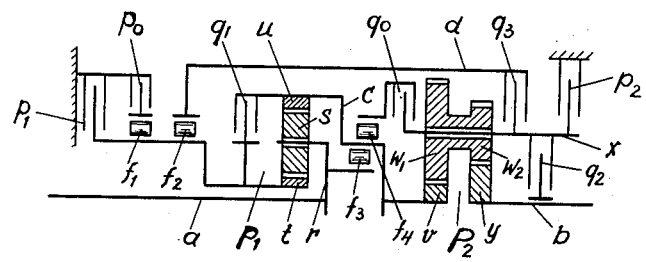
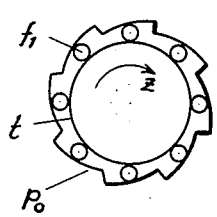 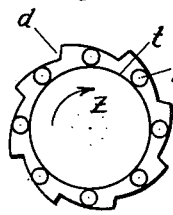 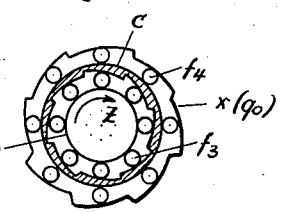
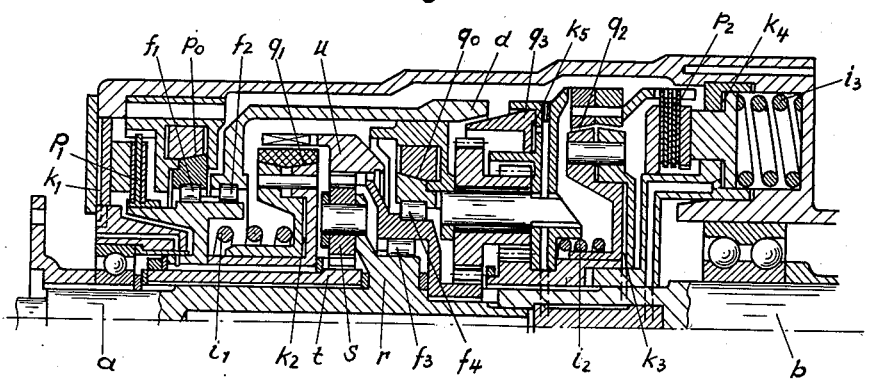
Inventor
Theodor F. Kümmich, Deceased
By Maria K. Kümmich, Administratrix.
By Austin, Liiske, Wilhelm and Padlon
Attorneys

United States Patent Office 2,764,904
Patented Oct. 2, 1956

2,764,904

TRANSMISSION WITH GEAR GROUPS CONNECTED IN TANDEM ARRANGEMENT

Theodor F. Kümmich, deceased, late of Stuttgart, Germany, by Maria K. Kümmich, administratrix, Stuttgart, Germany, assignor to Daimler-Benz Aktiengesellschaft, Stuttgart-Unterturkheim, Germany Application February 12, 1952, Serial No. 271,212

Claims priority, application Germany February 12, 1951

20 Claims. (Cl. 74—763)

The present invention relates to a transmission, preferably for motor vehicles with gear groups particularly designed as planetary gears connected in tandem arrangement, wherein main one-way clutches and reverse one-way clutches are used for transferring or sustaining the torque while changing over from one transmission ratio or speed gear to another.

An object of the present invention is especially the application of the principle of one-way clutches and reverse one-way clutches also for such gears with gear groups connected in tandem arrangement. In the former patent application, Serial No. 234,075, by Hans-Joachim M. Foerster, filed June 28, 1951, and entitled "Change Speed Gear and Method of Shifting Therefor," a connection was produced, for example, by appropriately arranging main one-way and reverse one-way clutches adapted to be connected to and disconnected with multiple speed gears so that, when changing over from one to another transmission ratio or speed gear, for example, from a lower to a higher speed or gear, first an intermediate stage or intermediate state was established, in which, with the engine driving the output shaft, the previously engaged speed or gear was kept on, whereas the new speed or gear was engaged with the output shaft driving the engine, e. g. with vehicles driving downhill and/or when the throttle of the engine is relieved, so that a drive was effected in either direction of drive in the newly engaged speed or gear only when at least one further clutch was engaged. In this way it was possible to change from one to another speed gear by steps without interrupting the drive, particularly so that the above-mentioned intermediate stage was engaged by disengaging a clutch or a brake corresponding to the clutch, and then the new speed gear was definitely engaged by connecting another clutch or a brake corresponding to the clutch. However, the application of this principle met with difficulties for gear groups in which one must shift alternately in a first gear group and in a second gear group. According to an important characteristic of the present invention these difficulties, particularly when using planetary gears, are eliminated by providing in addition to the driving connection normally serving for the transmission of torque from the first to the second gear group, another supporting connection by way of a one-way clutch between gear members of both gear groups particularly between brakable gear members of the two planetary gears. Moreover, according to a further characteristic of the present invention in addition to this one-way clutch an additional reverse one-way clutch is provided for between the gear member of the two gear groups so that, when changing over from the one to the other gear group with a drive in one direction of drive, for example, with the engine driving the output shaft, the one one-way clutch takes up the drive, and with a drive in the other direction of drive, for example with a pushing vehicle when the output shaft drives the engine, the reverse one-way clutch takes up the drive.

More particularly, according to another characteristic of the present invention, the arrangement of the transmission is made in such a way that each of the two planetary gears produces a drive transmission by braking a gear member thereof, preferably the first planetary gear producing a gearing up, and second planetary gear producing a gearing down, and by the engaging two gear members together thereby producing a direct drive transmission; for this case a one-way clutch is coordinated with the brakes or clutches, the one-way clutch coordinated with the brake of the second planetary gear being supported on the brakable gear member of the first planetary gear. The one-way clutch in the additional supporting connection is expediently adapted to be disengaged by an appropriate clutching arrangement. The engagement of this supporting connection is only necessary when a changing over from the one to the other gear group, particularly a planetary gear, is required; however, it is appropriate to effect engagement thereof ahead of time, at a moment when there exists no difference in speed between the parts to be clutched, particularly when these parts are inactive.

Owing to the present invention it is also possible to utilize with group gears the advantages given by using one-way clutches and reverse one-way clutches, namely to avoid an interruption of the drive during the shifting, particularly at any position of the throttle valve lever of the engine. More particularly, in this case, too, with every change over from a lower to a higher speed gear or reversely, an intermediate stage or an intermediate state may be established, in which, depending on which of the two coordinating one-way clutches takes effect, a higher or a lower speed gear picks up the drive. It is a further advantage of this mode of shifting that the clutches must not be matched as to the clutching operation and the clutching pressure, as they are engaged temporarily one after another in any intervals. According to a further characteristic of the present invention, by changing over from the one to the other gear group, an intermediate stage being provided for, in which, when changing up temporarily into a higher than the next speed gear, for example, into the 4th instead of the 3rd, with the output shaft driving the engine it is possible to restrict to a single shifting operation the more complicated mode of shifting on account of the operation of several clutches, which is otherwise required when changing over from the one to another gear group.

If furthermore care is taken that the one or the other clutch is engaged in a shifting state of the transmission, at which the parts to be clutched are in no difference of speed with respect to one another or the clutch is inactive, it is a further advantage that the concerned clutches may be designed small, and because of the non-existing centrifugal forces without releasing springs.

Further objects and advantages of the present invention will become obvious from the following description when taken in connection with the accompanying drawing which shows for purposes of illustration only one embodiment in accordance with the present invention, and wherein:

Figure 1 is a schematic diagram of the transmission in accordance with the present invention;

Figure 2 is a cross sectional view of the one-way clutch $f_1$;

Figure 3 is a cross sectional view of the one-way clutch $f_2$;

Figure 4 is a cross sectional view of the one-way clutches $f_3$ and $f_4$; and

Figure 5 is a cross section illustrating the construction of the transmission in accordance with the present invention schematically illustrated in Figure 1.

Referring now more particularly to the drawing where like reference characters are used in the various views thereof to designate like parts, reference character $a$ indicates the transmission shaft driven by the engine, for example, by way of a main clutch, $b$ the output shaft driving, for example, the driving axle of a motor vehicle, between which the planetary gears $P_1$ and $P_2$ are inserted in tandem arrangement as group gears. The first planetary gear $P_1$ consists of the planet carrier $r$ comprising the planet pinions $s$ and connected with the transmission shaft $a$, furthermore of the sun gear $t$ and the ring gear $u$; the second planetary gear $P_2$ consists of the sun gear $v$ connected with the ring gear $u$ by means of the intermediate shaft $c$, the double planetary gears $w_1$, $w_2$, supported on the planet carrier $x$, and the sun gear $y$ connected with the transmission shaft $b$.

The sun gear $t$ of the first planetary gear is, on the one hand, brakable by a brake $P_1$ whereby the planetary gear $P_1$ gears up from $a$ to $c$, and, on the other hand, adapted to be clutched with the ring gear $u$ by a clutch $q_1$ in order to get a direct transmission in the planetary gear $P_1$. Furthermore, the sun gear $t$ is supported on the case by a one-way brake including one-way clutch $f_1$ and releasable brake $p_0$ inserted between the case and one-way clutch $f_1$ and adapted to be disengaged, so that the one-way brake with an engaged brake $p_0$ allows a rotation of the sun gear $t$ in the main direction of the drive of the shafts $a$ and $b$, i. e. in the direction of arrow $z$ (Fig. 2). Moreover, there is another one-way clutch $f_3$ inserted between the transmission shaft $a$ and the intermediate shaft $c$ (Fig. 4) so that this one-way clutch allows an overrunning of the intermediate shaft $c$ with respect to the shaft $a$, yet blocks a reverse relative movement. Another one-way clutch $f_4$ (Fig. 4) is disposed between the intermediate shaft $c$ and—by inserting a clutch $q_0$—the planet carrier $x$ of the second planetary gear $P_2$ so that it allows an overrunning of the intermediate shaft $c$ in the direction of arrow $z$ with respect to the planet carrier $x$, yet blocks a reverse relative movement.

Moreover, the planet carrier $x$ is, on the one hand, brakable against the case by a releasable brake $p_2$ whereby a gearing down of the planetary gear $P_2$ from $c$ to $b$ is effected, and, on the other hand, clutchable with the drive shaft $b$ by means of the planetary gear $P_2$ for obtaining a direct transmission.

According to the present invention, the planet carrier $x$ of the second planetary gear is furthermore connected on the sun gear $t$ of the first planetary gear by way of a clutch $q_3$, a hollow shaft $d$, and a one-way clutch $f_2$ so that, as illustrated in Fig. 3, the one-way clutch $f_2$ allows an overrunning of the hollow shaft $d$, and of the planet carrier $x$ with respect to the sun gear $t$, yet blocks a reverse relative movement.

The transmission operates in the following way: In neutral position all the clutches and brakes are disengaged.

*1st speed gear.*—Clutch $q_1$ in the planetary gear $P_1$ and the brake $p_2$ in the planetary gear $P_2$ are engaged. Simultaneously, e. g. when starting the vehicle, caused by a fluid pressure produced by a pump driven by the output shaft, the brake $p_0$ and the clutch $q_0$ may be engaged and they remain engaged in all forward speed gears. (Accordingly, these particular shifting operations are no more mentioned hereinafter.) The planetary gear $P_1$ is blocked by the clutch $q_1$ and thus it transmits directly, whereas the planetary gear $P_2$ acts as an intermediate gear $v$, $w_1$, $w_2$, $y$, and gears down due to the braking of the planetary carrier $x$ by the brake $p_2$.

*Intermediate state.*—For engaging the second speed gear first the clutch $q_1$ is designated. With the engine driving the output shaft, due to the resistance at $u$, the sun gear $t$ tends to overrun the planet carrier $r$ in the direction $z$, which is allowed by the one-way clutches $f_1$ and $f_2$ ($q_3$ being disengaged), yet is prevented by the one-way clutch $f_3$, so that the shafts $a$ and $c$ are coupled with each other, and keep on the direct transmission in the planetary gear $P_1$. Thus the first speed gear remains engaged when the engine drives the output shaft, the one-way clutch $f_3$ functioning as the clutch $q_1$ for this direction of drive.

With the output shaft driving the engine there is nothing changed in the speed ratio of the planetary gear $P_2$ whereas in the first planetary gear $P_1$ the sun gear $t$ tends to move backward (opposite to $z$), due to the drive of $u$ and the resistance of $r$. However this is prevented by the one-way clutch $f_1$, acting as a reverse one-way clutch. As a result of it $t$ is blocked, and $r$ or $a$ is driven with a lower speed than $c$, which is allowed by the one-way clutch $f_3$. Thus the transmission ratio obtained in the planetary gear $P_1$ corresponds to a gearing up from $a$ to $c$, and for the entire transmission to a transmission in the second speed or gear.

*2nd speed gear.*—For definitely engaging the 2nd speed gear the clutch $p_1$ is engaged. It thereby functions as the reverse of one-way clutch $f_1$ and constitutes a brake for sun gear $t$ in either direction of the drive so that the sun gear $t$ is also blocked when the engine drives. In this way the planetary gear $P_1$ gears up, the planetary gear $P_2$ gears down, the effect of entire gear system is to gear down, too. With $t$ as well as $x$ being blocked, i. e. remaining stationary, the clutch $q_3$ may be engaged during the second speed gear along with $p_1$ since the parts $x$ and $d$ to be engaged by engagement of clutch $q_3$ are not moving relatively to each other. Thereafter the clutch $q_3$ may remain engaged in all the following speed gears.

*Intermediate stage.*—First brake $p_2$ is disengaged, i. e. released, while $p_1$ as well as $q_3$ remain engaged. In this way the transmission in the planetary gear $P_1$ remains the same as in the second speed gear, i. e. a gearing up from $a$ to $c$, whereas in the planetary gear $P_2$ the following conditions occur: With the engine driving the output shaft, owing to the resistance at $y$, the sun gear $v$ tends to drive the planet carrier $x$ in the backward direction of rotation, i. e., opposite to the direction of arrow $z$. However, this is prevented by the one-way clutch $f_2$ by means of which the hollow shaft $d$ connected with $x$ supports itself on the sun gear $t$ blocked by $p_1$ so that the second speed gear remains engaged.

With the output shaft driving the engine, owing to the resistance at $v$ and the drive at $y$, the planet carrier $x$ is shifted forward with respect to shaft $c$, i. e. attempts to rotate in the direction $z$ with respect thereto, which is allowed by the one-way clutch $f_2$, but prevented by the reversal one-way clutch $f_4$. In this way the planetary gear $P_2$ rotates as a whole in direct gear whereas the planetary gear $P_1$ gears up from $a$ to $c$. On the whole this means a temporary engagement of the 4th or overdrive speed or gear with the output shaft driving the engine.

*3rd speed gear.*—In order to definitely engage the 3rd speed gear, brake $p_1$ is released and thereupon first the clutch $q_1$, and then the clutch $q_2$ is engaged. In this way the planetary gear $P_1$ as well as the planetary gear $P_2$ are blocked in themselves so that a direct clutching is effected between the shafts $a$ and $b$ by way of the transmission.

*Intermediate stage.*—In changing over to the 4th gear the same shifting operation is followed as in changing over from the 1st to the 2nd speed gear. Thus first the clutch $q_1$ is disengaged again. Accordingly, with the engine driving the output shaft, due to the resistance at $u$, the shaft $a$ and the sun gear $t$ tend to overrun the intermediate shaft $c$ which is however prevented, on the one hand, by one-way clutch $f_3$ and, on the other hand, by one-way clutch $f_2$ as shaft $d$ rotates with the same speed as shaft $c$ due to the blocking of the planetary gear $P_2$. Consequently the direct speed gear remains engaged, as $P_2$ also provides a direct transmission ratio.

With a pushing vehicle, i. e. the output shaft driving the engine, due to the drive at $u$ and the resistance at $r$, the sun gear $t$ tends to run backward, which is prevented by one-way clutch $f_1$. Therefore the gearing of $P_1$ corresponds to the overdrive speed so that with a pushing vehicle the entire overdrive speed transmission is engaged.

*4th speed gear (overdrive gear).*—In order to definitely engage the 4th speed gear $p_1$ is engaged. In this way $t$ is blocked in either direction of drive, so that, with the engine driving the output shaft as well as with a pushing vehicle, i. e., the output shaft driving the engine, $P_1$ brings about a gearing up, and $P_2$ a direct transmission. In this way the overdrive gear is engaged definitely.

The changing down in gears or speeds is done in a corresponding reverse way.

The changing may be effected in any way, for example, mechanically, hydraulically, pneumatically, electrically or in any other way. However a fixed order must be followed in changing. The reverse speed may be established in any way. For instance a two speed gear alternately changing over from forward to reverse speed gear may be superposed to the group gear or arranged behind it.

Figure 5 illustrates a construction of the transmission according to Figure 1. In this case the shifting of the brakes and clutches is effected hydraulically in the above described order. The brake $p_0$ and the clutch $q_0$ are designed as piston-shaped cone clutches, whose pressure space is supplied by a pump driven by the output shaft $b$. The brake $p_1$ is designed as a single disk clutch controlled by the pressure space $k_1$. The clutch $q_1$ is designed as a double cone clutch, which is engaged by a spring $i_1$ and disengaged by a hydraulic pressure in the space $k_2$. The functioning of the clutch $q_2$ which is exposed to the action of a spring $i_2$ for disengagement thereof, and which is engaged by the pressure in the space $k_3$, is corresponding. The brake $p_2$ is designed as a multiple disk clutch which is engaged by a spring $i_3$, and which is disengaged by hydraulic pressure acting in the pressure space $k_4$. The clutch $q_3$ is designed as a cone clutch, and is engaged by the pressure in the pressure space $k_5$. The engagement being effected with inactive clutching parts, a separate clutching spring may be dispensed with.

Further details of the transmission shown in Figure 5 may be obtained by reference to Figures 1 through 4 wherein like parts are designated by like reference characters and which show some of the elements of the transmission of Figure 5 in detail. In order to facilitate understanding of the operation of the transmission shown in Figure 5, reference may be had to the following chart which indicates the status of the various parts of the transmission for the various speeds:

a first power transmission line connecting a second of the three members of the first planetary gear with one of the three members of the second planetary gear, a transmission member driven by a second of the three members of the second planetary gear, a second power transmission line connecting the third of the three members of the first planetary gear with the third of three members of the second planetary gear, said second power transmission line containing a one-way clutch and an interrupting clutch, first means for varying the effective transmission ratio of the first planetary gear, and second means for varying the effective transmission ratio of the second planetary gear.

2. A transmission comprising a first planetary gear with three elements including a planet carrier supporting at least one planet pinion and two central gear wheels in engagement with said planet pinion, a second planetary gear also with three elements including planet carrier supporting at least one planet pinion and two central gear wheels in engagement with said second-named planet pinion, a member driving one of said three elements of the first planetary gear, a first power transmission line connecting a second of said three elements of the first planetary gear with one of said three elements of the second planetary gear, a transmission member driven by a second of said three elements of the second planetary gear, a second power transmission line connecting the third of said three elements of the first planetary gear with the third of said three elements of the second planetary gear, said second power transmission line containing a one-way clutch and an interrupting clutch, first means for varying the effective transmission ratio of the first planetary gear, and second means for varying the effective transmission ratio of the second planetary gear.

3. A transmission according to claim 2, wherein in said first planetary gear said one of the three elements is said planet carrier supporting at least one planet pinion, the second a ring gear and the third a sun gear, and wherein in said second planetary gear said one of the three elements is a sun gear the second also a sun gear and the third said second-named planetary carrier supporting at least one planet pinion.

4. A transmission according to claim 2 further comprising another one-way clutch acting inversely with respect to said first-mentioned one way clutch and provided for between said first and said second power transmission line.

5. A transmission according to claim 2 in which in said first planetary gear said planet carrier supporting at least one planet pinion is the first mentioned of the three elements, a ring gear said second mentioned element, and a sun gear the third mentioned element, and in which in the second planetary gear a sun gear is said one of the three elements, a further sun gear the second and said second-mentioned planet carrier supporting at

|  | Releasable brake | | | Releasable clutch | | | | One-way clutch | | | | Engine driving output shaft | Output shaft driving engine |
| --- | --- | --- | --- | --- | --- | --- | --- | --- | --- | --- | --- | --- | --- |
|  | $p_0$ | $p_1$ | $p_2$ | $q_0$ | $q_1$ | $q_2$ | $q_3$ | $f_1$ | $f_2$ | $f_3$ | $f_4$ | | |
| 1st Speed | eng | diseng | eng | eng | eng | diseng | diseng | | | | | { $P_1$—direct | |
| 1-2 Intermediate | eng | diseng | eng | eng | diseng | diseng | diseng | (**) | | (*) | | $P_2$—gears down Same as 1st | 2d speed. |
| 2d Speed | eng | eng | eng | eng | diseng | diseng | eng | | | | | speed. { $P_1$—gears up | |
| 2-3 Intermediate | eng | eng | diseng | eng | diseng | diseng | eng | | (*) | | (**) | $P_2$—gears down Same as 2d | 4th speed. |
| 3d Speed | eng | diseng | diseng | eng | eng. 1st | eng. 2d | eng | | | | | speed. { $P_1$—direct | |
| 3-4 Intermediate | eng | diseng | diseng | eng | diseng. 1st. | eng | eng | (**) | (*) | (*) | | $P_2$—direct Same as 3d | 4th speed. |
| (Overdrive) 4th speed | }eng | eng | diseng | eng | diseng | eng | eng | | | | | speed. { $P_1$—gears up $P_2$—direct | |

*Operative with engine driving output shaft.
**Operative with output shaft driving engine.

What is claimed is:

1. A transmission comprising a first planetary gear comprising three members consisting of at least one planet pinion rotatably supported by a planet carrier and two central gear wheels in engagement with the planet pinion, a second planetary gear comprising three members consisting of at least one planet pinion rotatably supported by a planet carrier, and two central gear wheels in engagement with the planet pinion, a member actuating one of the three members of the first planetary gear, least one planet pinion the third, further comprising another one-way clutch acting inversely with respect to said first one-way clutch and provided between said first power transmission line and the planet carrier of said second planetary gear.

6. A transmission according to claim 2, wherein said means for varying the effective ratio of said first planetary gear comprises a brake adapted to block the third element of said first planetary gear, and wherein said means for varying the effective transmission ratio of said second planetary gear comprises a brake adapted to block the planet carrier of the third element of said second-mentioned planetary gear.

7. A transmission according to claim 2, in which said first means comprises a brake for the third element of said first planetary gear, and said second means comprises a brake for the planet carrier of said third element of said second planetary gear, and the planetary gears are formed so that in applying one of said brakes the coordinated planetary gear gears up, and in applying the other of said brakes the coordinated planetary gear gears down.

8. A transmission according to claim 2, in which one of said two planetary gears comprises pairs of planet pinions connected together, and the two central gear wheels of said one planetary gear are two sun gears.

9. A transmission according to claim 2, in which said first means and said second means comprise clutches and brakes, and hydraulic means, for controlling said clutches and brakes.

10. A transmission according to claim 2, in which said first means and said second means comprise clutches and brakes with resilient means for engaging the clutches and the brakes, and with hydraulic means for disengaging them.

11. A transmission according to claim 2, in which said first and second means comprise blocking means for simultaneously blocking the elements connected with said second power transmission line, and wherein the clutch in said second power transmission line is designed as a cone clutch adapted to be engaged with the above-mentioned elements blocked simultaneously.

12. A transmission comprising a relatively fixed part, a first planetary gear with three members consisting of at least one planet pinion rotatably supported by a planetary carrier, and of two central gear wheels, a second planetary gear with three members consisting of at least one planet pinion rotatably supported by a planet carrier with two central wheels, a driving member being in a driving connection and of one of the three members of the first planetary gear, a power transmission line connecting a second of these three members of said first planetary gear with a first of the three members of said second planetary gear, a driven member being in a driving connection with a second of said last-mentioned three members, a brake for the third member of said first planetary gear, a first clutch for locking said first planetary gear in itself, a releasable brake including a first one-way clutch between the third member of said first planetary gear and said relatively fixed part, enabling a drive of said last-mentioned third member in only one direction of rotation, a second brake for the planet carrier of the third member of said second planetary gear, a second clutch for locking said second planetary gear in itself, a second power transmission line between the third of the three members of said first and the third of the three members of said second planetary gear containing a third clutch, and a second one-way clutch enabling a drive of the third member of said first planetary gear with an inactive second power transmission line but in a direction of rotation reverse to said first one-way clutch, a third one-way clutch between said driving member and said first power transmission line, and a fourth one-way clutch between said first power transmission and said second power transmission line enabling a relative rotation of said first power transmission line with respect to said driving member in the same rotation as with respect to said second power transmission line.

13. A transmission according to claim 12, in which said second one way clutch allows rotation of said second power transmission line relative to the third member of said first planetary gear in a reverse direction of rotation, in the same way as said fourth one way clutch allows rotation of said second power transmission line with respect to said first power transmission line.

14. A transmission according to claim 12, in which the first member of said first planetary gear is the planet pinion supported by the planetary carrier of said first planetary gear, and the third gear member of the second planetary is the planet pinion supported by the planet carrier of said second planetary gear.

15. A transmission according to claim 12, in which said fourth one-way clutch is connected with said second power transmission line by means of the third member of said second planetary gear, and a fourth clutch between said fourth one-way clutch and the third member of said second planetary gear.

16. A transmission according to claim 12, in which said fourth one-way clutch is connected with said second power transmission line by means of the third member of said second planetary gear, further comprising a fourth clutch between said fourth one-way clutch and the third member of said second planetary gear, and means for producing a pressure for operating said releasable brake and fourth clutch dependent on the driving speed of the driving member so that the said brake and clutch are kept engaged when exceeding a certain speed.

17. A transmission comprising a first planetary gear comprising three members consisting of at least one planet pinion supported by a planet carrier and two central gear wheels in engagement with the planet pinions, a second planetary gear comprising three members consisting of at least one planet pinion supported by a planet carrier and two central gear wheels in engagement with the planet pinion thereof, a member driving one of the three members of said first planetary gear, a power transmission line connecting the second of the three members of said first planetary gear with one of the three members of said second planetary gear, a member driven by a second of the three members of said second planetary gear, another power transmission line connecting the third of the three members of said first planetary gear with the third of the three members of said second planetary gear, speed gear changing means each consisting of a clutch in each of the planetary gears for blocking each planetary gear in itself and one brake in each of the planetary gears for blocking that member which is connected to said second power transmission line, each clutch and brake including one-way clutch means coordinated therewith for producing upon engagement of said speed gear changing means by engaging and disengaging said clutches and brakes, first an intermediate stage, in which an immediately following speed may be engaged in one direction of drive only between the driving member and the driven one, whereas the hitherto existing speed remains in the opposite direction of drive, and the new speed is engageable in either direction of drive by engaging only another speed of said speed gear changing means.

18. A transmission comprising a relatively fixed part, a first planetary gear with three members consisting of at least one planet pinion rotatably supported by a planetary carrier and of two central gears, a second planetary gear with three members consisting of at least one planet pinion rotatably supported by a planet carrier and of two central gears, a driving member drivingly connected with one of the three members of said first planetary gear, a power transmission line connecting a second one of the three members of said first planetary gear with a first one of the three members of said second planetary gear, a driven member drivingly connected with a second one of the three members of said second planetary gear, a brake for the third member of said first planetary gear, a first clutch for locking said first planetary gear in itself, a one-way brake between the third member of said first planetary gear and said relatively fixed part to enable a drive of said last-mentioned third member in only one direction of rotation, a second clutch for locking said second planetary gear in itself, a second power transmission line including a third clutch between the third one of the three members of said first planetary gear and the third one of the three members of said second planetary gear, and a one-way clutch intermediate said first power transmission line and said driving member to enable a drive of the first member of said second planetary gear in only one direction of rotation with respect to the first member of said first planetary gear.

19. A transmission comprising a relatively fixed part, a first planetary gear with three members consisting of at least one planet pinion rotatably supported by a planetary carrier and of two central gears, a second planetary gear with three members consisting of at least one planet pinion rotatably supported by a planet carrier and of two central gears, a driving member drivingly connected with one of the three members of said first planetary gear, a power transmission line including a first clutch connecting a second one of the three members of said first planetary gear with a first one of the three members of said second planetary gear, a driven member drivingly connected with a second one of the three members of said second planetary gear, a first brake for the second member of said first planetary gear, a second clutch operative on the third member of said first planetary gear for locking said first planetary gear in itself, a one-way brake between the second member of said first planetary gear and said relatively fixed part to enable a drive of said last-mentioned second member in only one direction of rotation, a third clutch for locking said second planetary gear in itself, a second brake for the first member of said second planetary gear, and a second power transmission line including a one-way clutch intermediate the first member of said first planetary gear and second power transmission line for connecting the third member of said second planetary gear with the first member of said first planetary gear.

20. A transmission comprising a relatively fixed part, a first planetary gear with three members consisting of at least one planet pinion rotatably supported by a planetary carrier and of two central gears, a second planetary gear with three members consisting of at least one planet pinion rotatably supported by a planet carrier and of two central gears, a driving member drivingly connected with one of the three members of said first planetary gear, a power transmission line connecting a second one of the three members of said first planetary gear with a first one of the three members of said second planetary gear, a driven member drivingly connected with a second one of the three members of said second planetary gear, a brake for the third member of said first planetary gear, a first clutch for locking said first planetary gear in itself, a one-way brake between the third member of said first planetary gear and said relatively fixed part to enable a drive of said last-mentioned third member in only one direction of rotation, a second brake for the planet carrier of said second planetary gear, a second power transmission line including another clutch between the third one of the three members of said first planetary gear and the third one of the three members of said second planetary gear, and a one-way clutch intermediate said first power transmission line and said driving member to enable a drive of the first member of said second planetary gear in only one direction of rotation with respect to the first member of said first planetary gear.

References Cited in the file of this patent

UNITED STATES PATENTS

| | | |
|---|---|---|
| 2,351,213 | James | June 13, 1944 |
| 2,414,359 | Carnagua et al. | Jan. 14, 1947 |
| 2,546,378 | Winther | Mar. 27, 1951 |
| 2,645,137 | Roche | July 14, 1953 |

FOREIGN PATENTS

| | | |
|---|---|---|
| 387,623 | France | Jan. 14, 1947 |
| 602,497 | Great Britain | May 27, 1948 |